(12) United States Patent
Noda et al.

(10) Patent No.: US 7,692,883 B2
(45) Date of Patent: Apr. 6, 2010

(54) OPTICAL ELEMENT FIXING STRUCTURE, OPTICAL ELEMENT FIXING BODY, OPTICAL ELEMENT, AND OPTICAL ELEMENT HOLDER

(75) Inventors: Akio Noda, Hachinohe (JP); Aritaka Koizumi, Hachinohe (JP)

(73) Assignee: Sharan Instruments Corporation, Tokyo (JP)

(*) Notice: Subject to any disclaimer, the term of this patent is extended or adjusted under 35 U.S.C. 154(b) by 941 days.

(21) Appl. No.: 10/535,578

(22) PCT Filed: Dec. 16, 2003

(86) PCT No.: PCT/JP03/16134

§ 371 (c)(1),
(2), (4) Date: Feb. 2, 2006

(87) PCT Pub. No.: WO2004/055569

PCT Pub. Date: Jul. 1, 2004

(65) Prior Publication Data

US 2006/0139773 A1    Jun. 29, 2006

(30) Foreign Application Priority Data

Dec. 17, 2002 (JP) .............................. 2002-364820

(51) Int. Cl.
*G02B 7/02* (2006.01)
(52) U.S. Cl. ....................................... 359/819; 359/811
(58) Field of Classification Search ................. 359/819, 359/811, 813, 822, 823, 805, 808
See application file for complete search history.

(56) References Cited

U.S. PATENT DOCUMENTS 6,043,863 A    3/2000    Ikeda

FOREIGN PATENT DOCUMENTS

| JP | 56-091204 | 7/1981 |
| JP | 58-039069 | 3/1983 |
| JP | 360063739 A * | 9/1983 |
| JP | 63 006523 | 1/1988 |
| JP | 64-081613 | 3/1989 |
| JP | 11-14877 | 5/1989 |
| JP | 09-049899 | 2/1997 |
| WO | WO 92/20001 | * 11/1992 |

OTHER PUBLICATIONS

International Search Report corresponding to PCT/JP03/16134.

* cited by examiner

*Primary Examiner*—Ricky L Mack
*Assistant Examiner*—Brandi N Thomas
(74) *Attorney, Agent, or Firm*—Fay Sharpe LLP (57) ABSTRACT

The present invention provides an optical element fixing structure, an optical element fixing body, an optical element and an optical element holder which make tightening with a fixing screw unnecessary, prevents thereby a decrease in performance, such as the generation of strain in the optical element such as a crystal, and can improve the mounting accuracy. The optical element fixing structure 10 includes an optical element 6 and an optical element holder 1 to fix and mount the optical element 6. The optical element 6 has one or multiple slits 8 as strain and stress absorbing means in the thickness direction in the end part thereof, and the optical element holder 1 has depressing means 3 to fix the optical element 6 by depressing at least one of the front surface and the back surface of the optical element 6 outside the slit 8.

11 Claims, 6 Drawing Sheets

OPTICAL ELEMENT FIXING STRUCTURE, OPTICAL ELEMENT FIXING BODY, OPTICAL ELEMENT, AND OPTICAL ELEMENT HOLDER

TECHNICAL FIELD

The present invention relates to an optical element fixing structure, an optical element fixing body, an optical element and an optical element holder and, more particularly, to an optical element fixing structure, an optical element fixing body, an optical element and an optical element holder which can improve the mounting accuracy of an optical element, such as a crystal, by making tightening with a fixing screw unnecessary.

BACKGROUND ART

In fixing an optical element, such as a crystal for X-ray monochrometer, to a holder, it has hitherto been a general practice to perform this by tightening the optical element from the front surface side or back surface side of the element with a fixing screw.

Figure 7:
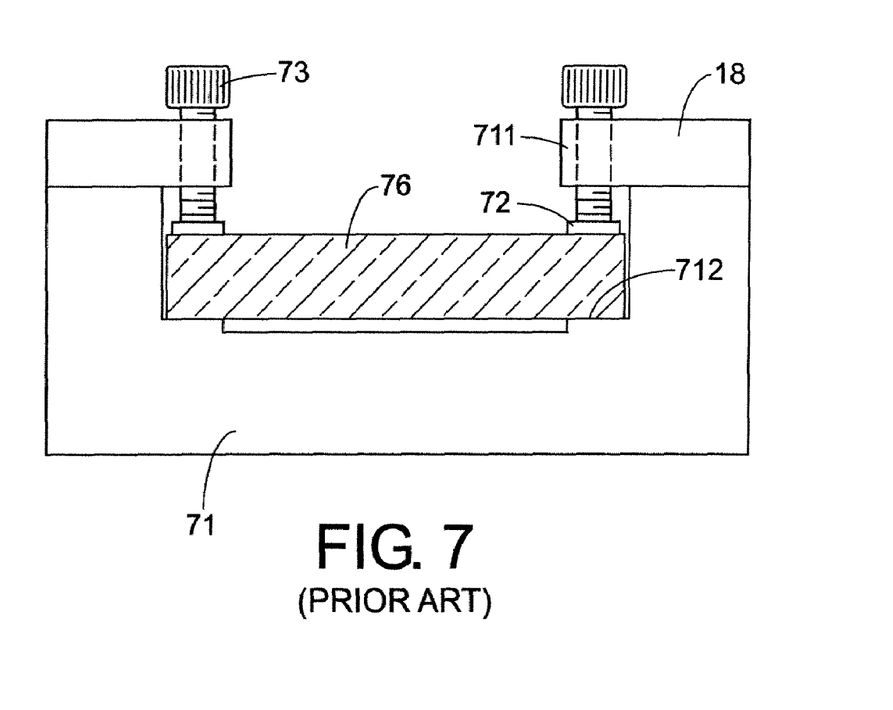
FIG. 7 is a sectional view which shows a conventional optical element fixing method.

FIG. 7 is a sectional view which shows a conventional method of fixing an optical element. In FIG. 7, conventionally, a crystal (an optical element) 76 is placed on a reference surface 712 provided on the inner bottom part of a crystal holder main body 71, and by use of a fixing screw 73 which is provided in a holder upper frame 711 in a piercing manner and is provided, at the lower end thereof, with a fixing plate 72 which directly depresses the crystal 76, both ends of the crystal 76 are tightened, whereby the crystal is fixed. However, this conventional technique had the following drawbacks.

(a) The tightening of the element surface by use of a fixing screw worsens the planarity of the optical element, resulting in a decrease in the performance of the optical element.

(b) The tightening of the element surface by use of a fixing screw adds strain to the optical element, with the result that the performance of the optical element decreases.

(c) The tightening with multiple fixing screws requires skills in handling in addition to the above-described decrease in performance.

(d) If the expansion and contraction of the holder and optical element occur due to temperature changes and the like, excessive stress is applied to the optical element and in the case of a brittle optical element, breakage may occur.

(e) Because the reference for the fixing position of the optical element is the back surface of the element, the mounting accuracy of the optical element decreases due to the thickness tolerance of the element and the irregular condition of the holder contact surface.

(f) It is an established method to use an organic substance spacer having elasticity in fixing by use of a fixing screw. However, in some measuring devices on which an optical element is mounted, resistance against an electromagnetic wave to be treated is not sufficient, and a decrease in performance of the optical element occurs due to the deterioration of such measuring devices. For example, because organic substances are inferior in radiation resistance, the use of an organic substance spacer has a drawback when used in X-ray monochrometer.

(g) Because the handling of an optical element requires skills, the conventional technique is inconvenient for those who are not familiar with the handling of a crystal.

In view of these problems, the present inventors have examined conventional techniques and as a result, some documents which may have relation to the problems were found. Among these documents, in "a channel-cut crystal" disclosed in the Japanese Patent Laid-Open No. 09-49899, a proposal is made to the effect that in order to keep the parallelism of two reflecting surfaces with high accuracy even in a case where a bottom surface is bonded and fixed to a fixing bed, in base portion between the two reflecting surfaces and the bottom surface there are made incisions parallel to the bottom surface. That is, in the channel-cut crystal of this invention, by making two incisions parallel to the base portion, and not to a working surface, the effect of stress and strain from the bonded portion is reduced and as a result, the parallelism of the reflecting surfaces can be kept with high accuracy (Document 1).

Similarly, as proposals to prevent the propagation of strain by use of a slit, there are proposed "a semiconductor diaphragm" in which a trench is provided in a fixed part near a chip in order to obtain stability against ambient temperature changes of a pressure detection element (Document 2) and "a combined prism fixing structure" in which in order to reduce the effect of strain and stress after bonding and fixing, only one prism is bonded and fixed and a groove is provided near the joint surface of the two prisms (Document 3).

Document 1: Japanese Patent Laid-Open No. 09-49899,
Document 2: Japanese Patent Laid-Open No. 58-39069
Document 3: Japanese Utility Model Laid-Open No. 1-81613

However, in the proposal about a channel-cut crystal shown in Patent Document 1, the fixing of the bottom surface of the crystal is predicated on the use of an adhesive and to reduce strain due to the adhesive is the purpose of this proposal. That is, on the precondition that fixing is performed by use of an adhesive, the function of the incisions is to reduce the propagation of the strain generated in the base portion of the crystal in association with the drying of an adhesive layer on the bottom surface over to the working surface as the optical element provided in the upper part of the crystal. On the other hand, what was described above as a task in the present invention is to review a fixing method by use of a fixing screw, which produces stress and strain which are also large as with an adhesive, in the mounting of an optical element in the form of a single plate to the holder. Therefore, in optical elements having universal shapes such as an optical element in the form of a single plate, the technique of Document 1 cannot provide a solution to any of the above-described problems in the fixing of these optical elements of universal shapes to a holder by use of a fixing screw.

Also, the proposals of Patent Documents 2 and 3 which disclose strain and stress absorbing means related to elements having special shapes, such as a semiconductor diaphragm and a complex prism, cannot provide solutions to any of the above-described problems in the fixing of these elements having special shapes to a holder by use of a fixing screw in optical elements having universal shapes such as an optical element in the form of a single plate, as well as the above-described "a channel-cut crystal".

Furthermore, in the fixing of an optical element, it is important to prevent not only strain, but also the generation of noise due to the occurrence of surface waves and abnormal transmitted waves.

The task of the present invention is to provide a method of fixing an optical element which can improve the mounting accuracy by preventing a performance decrease, such as the generation of strain in an optical element such as a crystal by solving the above-described defects in the conventional techniques and by making tightening with a fixing screw unnecessary. In other words, the task of the invention is to provide an optical element fixing structure, an optical element fixing body, an optical element and an optical element holder which makes this method possible.

Another task of the present invention is to provide an optical element fixing structure, an optical element fixing body, an optical element and an optical element holder which can solve each of the above-described problems in fixing optical elements of universal shapes, such as an optical element in the shape of a single plate to a holder by use of a fixing screw (the worsening of planarity, a decrease in element performance, a danger of breakage and a decrease in mounting accuracy due to the generation of strain, the use of an organic substance spacer, and required skills in handling).

A further task of the present invention is to provide an optical element fixing structure, an optical element fixing body, an optical element and an optical element holder which can improve the performance of an optical element by cutting noises, such as surface waves and abnormal transmitted waves, in the fixing of the optical element.

DISCLOSURE OF THE INVENTION

The present inventors have devoted themselves to the examination of the above problems. As a result, they have found that the above problems can be solved by using depressing means by an elastic body and the like and made the present invention. That is, the features for which a patent is applied in the present application are as follows:

(1) An optical element fixing structure, characterized in that the optical element fixing structure is an optical element fixing structure to fix an optical element such as a crystal which comprises an optical element and an optical element holder to fix and mount the optical element, in that the optical element has one or multiple slits in the thickness direction in an outer edge part thereof (which is present on the optical element but outside a working surface of the optical element and can be used as a portion to fix the optical element to the optical element holder; this applies also in the following), and in that the optical element holder has depressing means to fix the optical element by depressing at least one of the front surface and the back surface of the optical element outside the slit.

(2) The optical element fixing structure according to (1), characterized in that the depressing means depresses only one surface, which is one of the back surface and the front surface of the optical element.

(3) The optical element fixing structure according to (1) or (2), characterized in that the depressing means is an elastic body attached to the optical element holder.

(4) The optical element fixing structure according to any of (1) to (3), characterized in that the planer shape of the optical element is any of a rectangle, a circle, an ellipse and a polygon, such as a triangle, a parallelogram and a hexagon.

(5) The optical element fixing structure according to any of (1) to (4), characterized in that the slit has a depth sufficient for preventing the propagation of only depression strain of the optical element to the working surface of the element.

(6) The optical element fixing structure according to (5), characterized in that the slit has a depth which is not less than half the thickness of the optical element.

(7) The optical element fixing structure according to (5) or (6), characterized in that the slit is provided in both of the front surface and the back surface of the optical element.

(8) The optical element fixing structure according to (7), characterized in that the slit is provided alternately on the front surface and back surface of the optical element.

(9) The optical element fixing structure according to any of (5) to (8), characterized in that the slit is a linear structure at least one end of which is open to a side surface of the optical element (which surface is the surface which connects the front surface and the back surface together; this applies also in the following).

(10) The optical element fixing structure according to (9), characterized in that the optical element is in the shape of a rectangle and in that the slits are provided in at least two locations of the outer edge part of the optical element, one slit for each location.

(11) The optical element fixing structure according to (9), characterized in that the optical element is in the shape of a rectangle and in that the slits are provided in at least two locations of the outer edge part of the optical element, multiple slits for each location.

(12) The optical element fixing structure according to any of (5) to (8), characterized in that the slit is in the shape of a circuit or a convolution, such as a circle and a rectangle.

(13) The optical element fixing structure according to (12), characterized in that the optical element is in the shape of a circle or an ellipse.

(14) The optical element fixing structure according to any of (2) to (13), characterized in that the elastic body is a plate spring.

(15) The optical element fixing structure according to any of (2) to (14), characterized in that the elastic body is provided on a surface of a base for fixing the elastic body, in that the base for fixing the elastic body is provided in a bottom part of the optical element holder, and in that on the back surface of the base for fixing the elastic body there is provided adjusting means, which is capable of adjusting the depression by the elastic body by up-and-down movements of the base for fixing the elastic body, in such a manner as to pierce through the optical element holder.

(16) The optical element fixing structure according to (15), characterized in that the adjusting means is an adjusting screw and is provided on the back side of the elastic body.

(17) The optical element fixing structure according to any of (1) to (16), characterized in that the optical element is a crystal for X-ray monochrometer.

(18) An optical element fixing body, characterized in that the optical element fixing body has the optical element fixing structure according to any of (1) to (17).

(19) An optical element, characterized in that the optical element can constitute the optical element fixing body according to (18).

(20) An optical element holder, characterized in that the optical element holder can constitute the optical element fixing body according to (18).

That is, in an optical element fixing structure, an optical element fixing body, an optical element and an optical element holder of the present invention, in addition to the slit structure as strain and stress absorbing means, the use of the depressing means, such as an elastic body, makes tightening by use of a fixing screw unnecessary, improves the mounting accuracy of an optical element, such as a crystal, and provides solutions to the above-described various problems in holder fixing in optical elements of universal shapes, such as an optical element in the shape of a single plate.

Incidentally, in the present invention, owing to its constituent features, it is possible to not only remove strain, but also cut surface waves and abnormal transmitted waves in an optical element, thereby to improve the performance of the optical element.

The following are descriptions of the reference numerals used: 1, 21, 31, 41 . . . Optical element holder, 3, 23, 33 . . . Depressing means, 6, 16, 26, 36, 46 . . . Optical element, 8, 18, 28, 38 . . . Slit, 10, 20, 30, 40, 50 . . . Optical element fixing structure, 34 . . . Adjusting means, 35 . . . Elastic body fixing base, 59 . . . Fixing part, 500 . . . Optical element fixing body, 61, 62 . . . Swivel goniohead, 63 . . . Rotary goniohead, 64 . . . Rectilinear slide, 65 . . . Optical table, 600 . . . Optical element fixing body, 71 . . . Crystal holder, 711 . . . Holder upper frame, 712 . . . Reference surface, 72 . . . Fixing plate, 73 . . . Fixing screw, 76 . . . Crystal (optical element)

BEST MODE FOR CARRYING OUT THE INVENTION

The present invention will be described below in further detail with reference to the drawings. However, the present invention is not limited to the forms shown in these drawings.

Figure 1:
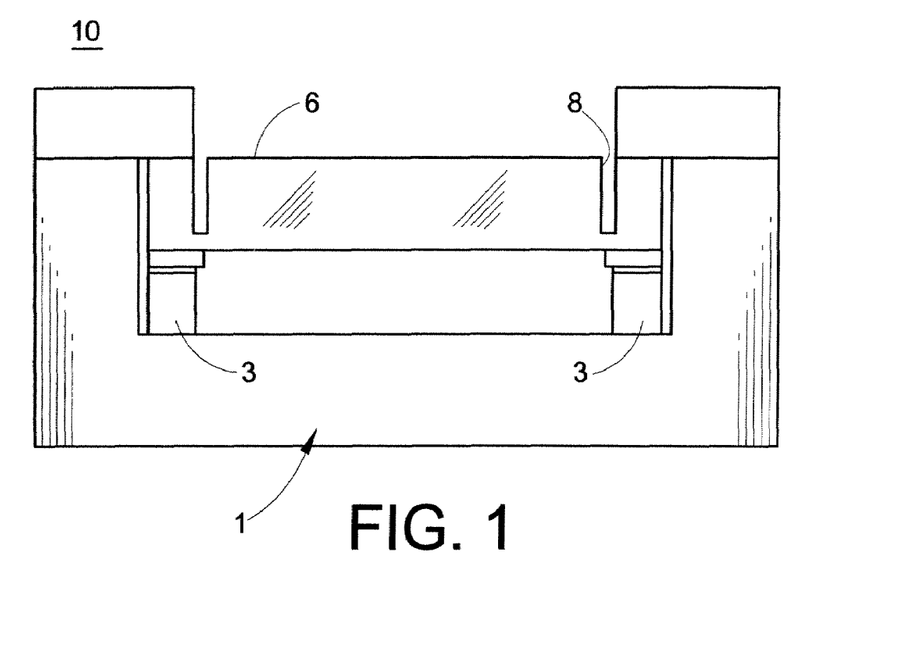
FIG. 1 is a sectional view which shows the construction of an optical element fixing structure of the present invention.

FIG. 1 is a sectional view which shows the construction of an optical element fixing structure of the present invention. In the figure, this optical element fixing structure 10 comprises an optical element 6 and an optical element holder 1 to fix and mount the optical element 6, and this is an optical element fixing structure 10 to fix an optical element such as a crystal. The optical element 6 has one or multiple slits 8 as stress absorbing means in the thickness direction in the outer edge part thereof, and the optical element holder 1 has depressing means 3 to fix the optical element 6 by depressing at least one of the front surface and the back surface of the optical element 6 outside the slit 8. These are main constituent features (1).

As shown in the figure, this optical element fixing structure 10 can be constructed as follows. That is, the depressing means 3 is provided in such a manner as to abut against only one surface of the optical element 6 (in the figure, the back surface), and on the other surface (in the figure, the front surface), the inner circumferential surface of the optical element holder 1 for fixing the optical element (in the figure, the surface on the inside of the holder upper frame) is used as a reference surface for fixing and the surface of the optical element 6 (in the figure, the front surface) is caused to abut against this inner circumferential surface.

In this specification, the front surface of the optical element refers to the surface on the side having the surface which is a portion used as the optical element (hereinafter referred to as "the working surface,") and, in the figure, this is the surface in which the slit 8 is provided (this applies also in the following). On the other hand, the back surface is the surface on the opposite side from the front surface.

In the present invention, the depressing means refers to means which works in a multipoint manner, and not a structure in which, as with a fixing screw in the above-described conventional methods, the force for fixing works on an optical element only locally. As a result of this, with the force for fixing an optical element not locally concentrated, it is possible to reduce or prevent the generation of strain and stress, and hence it is possible to perform fixing without abnormal strain being generated in an optical element such as a crystal. Concretely, an elastic body or the like which will be described later is the depressing means of the present invention.

By adopting the construction shown in FIG. 1, in the optical element fixing structure 10 of the present invention, the optical element 6 is fixed to the optical element holder 1 and loaded thereon. However, without the aid of a fixing screw which has hitherto been used, this optical element 6 is fixed to the optical element holder 1 and loaded thereon by depressing, by use of the depressing means 3, at least one of the front surface and back surface of the optical element 6 outside the slit 8 provided in the thickness direction of the end portion of the optical element 1. As shown in the figure, the depressing means 3 is provided in such a manner as to abut against only one surface of the optical element 6 (in the figure, the back surface), and on the other surface (in the figure, the front surface), the inner circumferential surface of the optical element holder 1 for fixing the optical element (in the figure, the surface on the inside of the holder upper frame) is used as a reference surface for fixing and the surface of the optical element 6 (in the figure, the front surface) is caused to abut against this inner circumferential surface. In this case, the optical element 6 is fixed to the optical element holder 1 and mounted thereon, with one surface (in the figure, the front surface) abutting against the inner circumferential surface of the optical element holder 1 (in the figure, the inside of the holder upper frame) and the other surface (in the figure, the back surface) depressed by the depressing means 3.

In the figure, the depressing means 3 and the inner circumferential surface of the optical element holder 1 (the holder upper frame and the like) are a structure in which forces work in a multipoint manner, and not a structure like a fixing screw in which forces work locally. Therefore, the generation of strain and stress in the optical element 6 is reduced or prevented, and the generation of strain in the optical element 6 is eliminated. Because this fixing is performed outside the one or multiple slits 8 (on the outer circumferential side on the element surface), stress and strain generated by the fixing pressure are absorbed by the slit 8 and the propagation of stress and strain to the working surface is reduced or prevented and it is possible to prevent a decrease in the performance of the optical element.

As shown in the figure, in the optical element fixing structure 10 of the present invention, the depressing means 3 can be constructed in such a manner that as described above, only one surface, which is one of the back surface and the front surface of the optical element 6, can be depressed (2). That is, in the present invention, in the case of an optical element having a working surface on the front surface of the element, such as X-rays and visible rays, it is possible to use the front surface as a reference surface for fixing and only the back surface of the optical element is depressed. In this case, outside the slit 8 (in the outer edge part of the slit), the front surface of the optical element 6 (the surface on the side having the working surface) is caused to abut against the inner side surface of the holder upper frame of the optical element holder 1 as a reference surface and fixed to this inner side surface, and the back surface is depressed and fixed by the depressing means 3 in a multipoint manner. By adopting the front surface side of the element (side on which the working surface is provided) as the reference for fixing optical element 6 like this, compared to the conventional methods in which the reverse side is the reference, it is possible to prevent a decrease in mounting accuracy due to thickness tolerances of the element and the irregular condition of the holder contact surface and to improve this accuracy.

On the other hand, in the case of an optical element in which the back surface serves as a reference surface, it is possible to adopt a construction in which only the front surface of the optical element 6 as a reference surface for fixing the back surface is depressed.

In the figure, the optical element fixing structure 10 of the present invention, the depressing means 3 may be an elastic body attached to the optical element holder 1 (3). Appropriate ones can be used as the elastic body of the present invention so long as they are an elastic body which provides multipoint depressing means for at least one surface, which is one of the front surface and the back surface of the optical element 6, preferably for the back surface. For example, they are rubber, a spring, foamed ceramics, foamed metals, engineering plastics, gelatinous substances, gases, etc. For example, by using a plate spring, which will be described later, the depressing means of the present invention can be easily formed.

Among the elastic bodies of the depressing means, it is possible to use silicone resin, for example, as gelatinous substances, and compressed air and other gases capable of being sprayed by use of a mechanism which sprays gases, for example as gases.

In a case where the optical element fixing structure of the present invention is used in a measuring device which uses radioactive rays as electromagnetic waves to be treated, for example, a crystal for X-ray monochrometer, elastic bodies which meet prescribed conditions, such as radiation resistance, must be used. They are, for example, a spring, foamed ceramics, foamed metals, gases, etc. However, by using a plate spring, which will be described later, the depressing means of the present invention can be easily formed.

By forming a depressing body in which many depressing points are provided or a depressing body in which a smooth depressing surface is provided as an elastic body from materials such as a spring, foamed ceramics, foamed metals, engineering plastics, rubber, gelatinous substances, gases, etc., it is possible to distribute the depressing pressure for the fixing of the optical element 6 or make the depressing pressure on the element uniform which is depressed. Thus it is possible to further reduce or prevent the generation of strain and stress.

Irrespective of the shape shown in the figure, the planer shape of the optical element 6 may be any of a rectangle, a circle, an ellipse and a polygon, such as a triangle, a parallelogram and a hexagon (4). That is, it is possible to adopt not only the rectangle shown in the figure, but also free shapes. As a result of this, it is possible to improve the performance of the optical element from the standpoint of the shape of the element, for example, in a case where the element is formed in the same elliptic shape as the sectional shape of the optical axis.

In the optical element fixing structure 10 of the present invention, the slit 8 has a depth sufficient for preventing the propagation of only depression strain of the optical element 6 to the working surface of the element (5). That is, by adopting this construction, the propagation of depression strain to the working surface of the element can be more efficiently prevented. For the example, the depth may be not less than half the thickness of the optical element 6 (6). However, in the present invention, the depth is not limited to this, and it is possible to adopt an appropriate depth which can ensure a sufficient action of preventing strain propagation in applications where the optical element is used.

Figure 2:
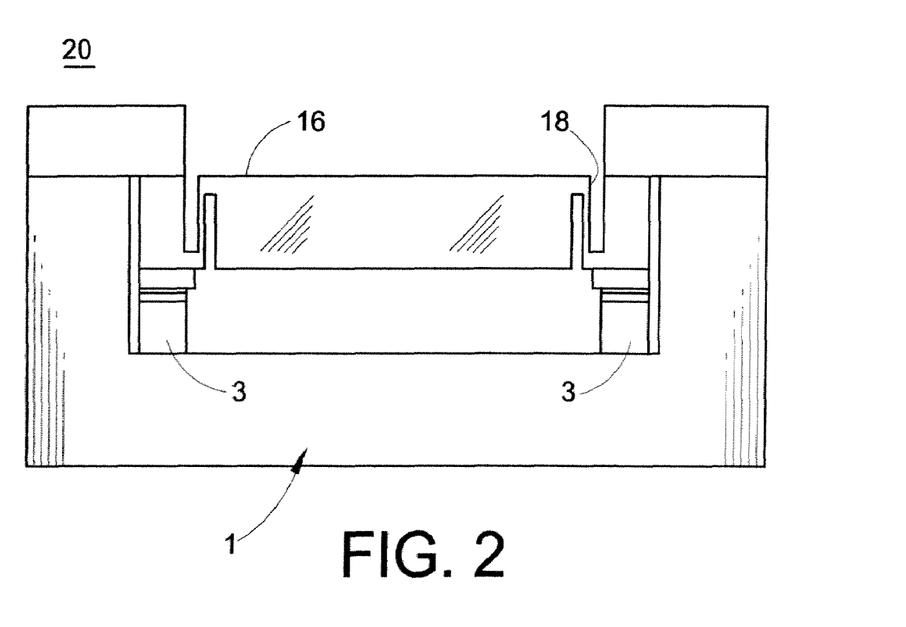
FIG. 2 is a sectional view which shows the construction of an optical element fixing structure of the present invention in which multiple slits are provided.

FIG. 2 is a sectional view which shows the construction of an optical element fixing structure of the present invention in which multiple slits are provided for one fixed part (outer edge part). In the figure, in an optical element fixing structure 20 of the present invention, the slit 18 may be provided in both of the front surface and the back surface of the optical element 16 in addition to each of the constructions shown in FIG. 1 or to replace them (7). In the figure, the reference numeral 1 denotes an optical element holder, and the reference numeral 3 denotes depressing means such as an elastic body. Irrespective of this, in the optical element fixing structure of the present invention, multiple slits may be provided only on one surface, which is one of the front surface or the back surface of the element.

In the figure, the slit 18 may be provided alternately on the front surface and back surface of the optical element 16 (8). Providing the slit alternately on the front surface and the back surface increases the action of absorbing strain and stress and hence the propagation of depression strain can be more prevented. The number of slits 18 which are alternatively provided may be one on the front surface and one on the rear surface for each fixing edge portion as shown in the figure, or two or more slits may be provided, or it is possible to provide two slits on the front surface and one slit on the back surface, or its reverse pattern may be adopted (one on the front surface and two on the back surface), or it is possible to adopt other patterns in which slits are alternately provided on the front pattern and the back pattern. As a result of this construction, the function of strain and stress absorption is further enhanced and it is possible to further improve the effect of reducing or preventing the generation of stress and strain on the surface of the optical element 16.

The slit 18 may be a linear structure at least one end of which is open to a side surface of the optical element 16 (9). That is, the slit 18 in the present invention may be constructed in such a manner that both ends thereof are open to a side surface of the optical element 16 like a road constructed by cutting open a hill or may be a slit only one end of which is open. Irrespective of these, the slit may also be constructed in such a manner that neither of the two ends lead to a side surface of the optical element.

The optical element fixing structure of the present invention may be constructed in such a manner that the optical element is in the shape of a rectangle and that, as shown in FIG. 1, the slits are provided in at least two locations of the outer edge part of the optical element, one slit for each location (10). In addition, as shown in FIG. 2, the slits 18 may also be provided in at least two locations of the outer edge part of the optical element 16, multiple slits for each location (11). As shown in FIG. 1, by providing one slit 8 near each of the fixing parts (outer edge parts) of the optical element 6 and performing fixing by use of the depressing means 3, it is possible to effectively reduce or prevent the generation of strain in the optical element 6. However, as shown in FIG. 2, by providing two or more slits 18 as strain and stress absorption means near the fixing parts (outer edge parts) on the optical element 16, the function of strain and stress absorption is enhanced and it is possible to further improve the reducing and preventing effects on the generation of stress and strain on the surface of the optical element 16 compared to the case of only one slit.

In the figure, the slit 18 is provided in two locations, two for each location, and that alternately on the front surface and the back surface. However, the present invention is not limited to this, and it is possible to provide three or more slits, the locations where the slits are provided may be only one surface, i.e., either the back surface or the front surface, and furthermore it is possible to adopt a form in which the slits are provided on both the back surface and the front surface, but not alternately.

The locations where the slits are provided are two points opposite to each other as shown in the figure. Furthermore, for example, in the case of a rectangular optical element, slits may be provided on three sides or they may also be provided on four sides. Similarly, also when polygons except a rectangle, a circle and an ellipse are used as the shape of the optical element, the slits of the present invention are not limited to two locations opposite to each other, and it is possible to provide slits in arbitrary top portions of the outer edge parts in an arbitrary total number.

Irrespective of the above-described descriptions, in the optical element fixing structure of the present invention, the slit may be in the shape of a circuit or a convolution, such as a circle, an ellipse and a rectangle (12). Also, the optical element in the shape of a circle or an ellipse is used and, at the same time, there may be provided slits in the shape of a circuit or a convolution, such as a circle and an ellipse or a rectangle etc (13). Therefore, for example, it is possible to provide one or more circular slits which are concentric with a circular optical element and this optical element is fixed.

Because the optical element fixing structure of the present invention is constructed and functions as described above, this optical element fixing structure not only can remove the strain of the optical element, but also cuts noises such as surface waves and abnormal transmitted vales so that it can improve the performance of the optical element itself.

Figure 3:
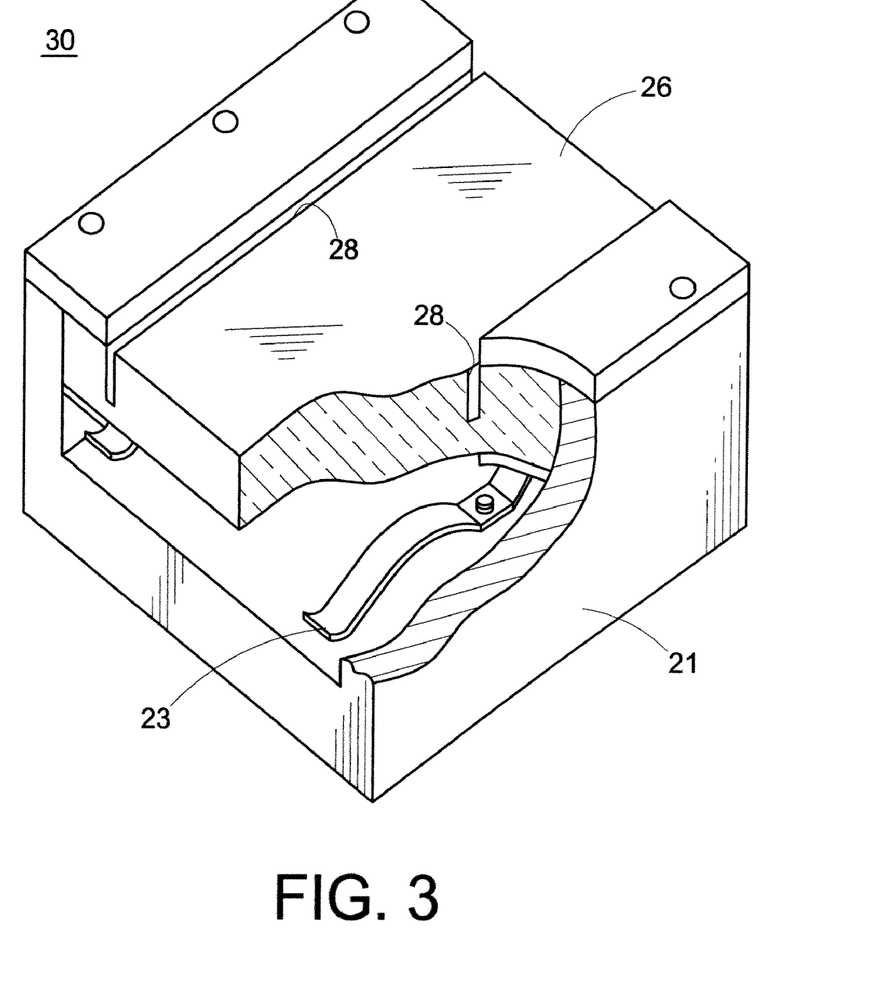
FIG. 3 is a partially cutaway view in perspective of the construction of an optical element fixing structure of the present invention, in which a plate spring is used as elastic means.

FIG. 3 is a partially cutaway view in perspective of the construction of an optical element fixing structure of the present invention, in which a plate spring is used as elastic means. In the figure, an optical element fixing structure 30 of the present invention may be the same as the structure described with reference to FIGS. 1 and 2, with the exception that a plate spring 23 is used as an elastic body which is the depressing means (14). In the figure, the reference numeral 21 denotes an optical element holder, the numeral 26 an optical element, and the numeral 28 a slit. By using the plate spring 23 as the depressing means, the multipoint fixing by depressing of the optical element 26 can be easily performed, and it is possible to easily prevent the propagation of stress and strain and to improve the amounting accuracy of the optical element 26.

Figure 4:
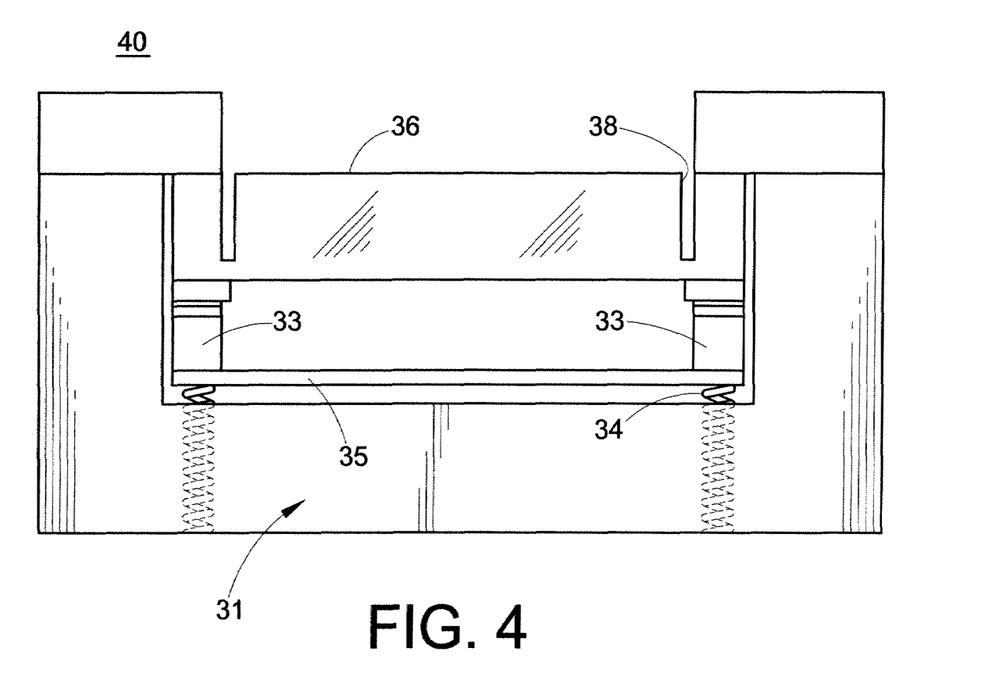
FIG. 4 is a sectional view which shows the construction of an optical element fixing structure of the present invention, in which adjusting means which adjusts depressing is provided.

FIG. 4 is a sectional view which shows the construction of an optical element fixing structure of the present invention, in which adjusting means which adjusts the depressing pressure. In the figure, in an optical element fixing structure 40 of the present invention, the elastic body 33 is provided on a surface of a base 35 for fixing the elastic body, the base 35 for fixing the elastic body is provided in a bottom part of the optical element holder 31, and on the back surface of the base 35 for fixing the elastic body there is provided adjusting means 34, which is capable of adjusting the depressing pressure by the elastic body 33 by up-and-down movements of the base for fixing the elastic body, in such a manner as to pierce through the optical element holder 31 (15). In the figure, the reference numeral 36 denotes an optical element, and the numeral 38 a slit.

In the figure, because the optical element fixing structure 40 of the present invention is constructed as described above, the optical element 36 is depressed and fixed by the elastic body 33 provided on the surface of the base 35 for fixing the elastic body, which is installed fixedly on the bottom part of the optical element holder 31. And the base 35 for fixing the elastic body is moved up and down by adjustments which cause up-and-down movements in the adjustment means 34 provided on the back surface of the base 35 for fixing elastic body, as a result of which the elastic body 33 provided on the base 35 for fixing elastic body is caused to move up and down and the depressing pressure to the optical element 36 depressed by the elastic body 33 is adjusted. This action enables the distribution of the depressing pressure by the elastic body 33 which is the depressing means to be changed and it is possible to make adjustments in order to minimize various kinds of strains generated during the fixing of the optical element.

In the figure, the adjustment means 34 may be provided in appropriate positions in an appropriate number of stages. Therefore, the adjustment means 34 can be provided in a portion away from the position of the elastic body 33, for example, near the middle of the base 35 for fixing the elastic body. However, in order that as shown in the figure, the adjustment of the depressing pressure can be made for both end portions for fixing the optical element 36, it is possible to adopt a construction in which at least one adjustment means 34 is provided for each end portion. It also is possible to provide two adjustment means or three or more adjustment means for each end portion. By increasing the number of adjustment means to a certain degree, adjustments of the distribution of the depressing pressure can be made more finely and it is possible to further reduce various kinds of strains generated during the fixing of the optical element.

In the figure, in the optical element fixing structure 40 of the present invention, a crew is used as the adjustment means 34 and this adjusting screw can be provided on the back side of the elastic body 33 (16). That is, the base 35 for fixing the elastic body to fix the elastic body 33, such as a plate spring, is moved up and down by the rotational operation of the screw from the back side and the depressing pressure on the optical element 36 by the elastic body 33 is increased or decreased in a prescribed position, whereby the generation of strain during the fixing of the optical element can be minimized.

Owing to the above-described construction and action, the present invention can be widely used in measuring devices, such as a crystal for X-ray monochrometer (including both a crystal for probe and a crystal for analyzer) (17) and crystals for other monochrometers.

Embodiments

The present invention will be described below on the basis of embodiments. However, the invention is not limited to these embodiments.

Figure 5:
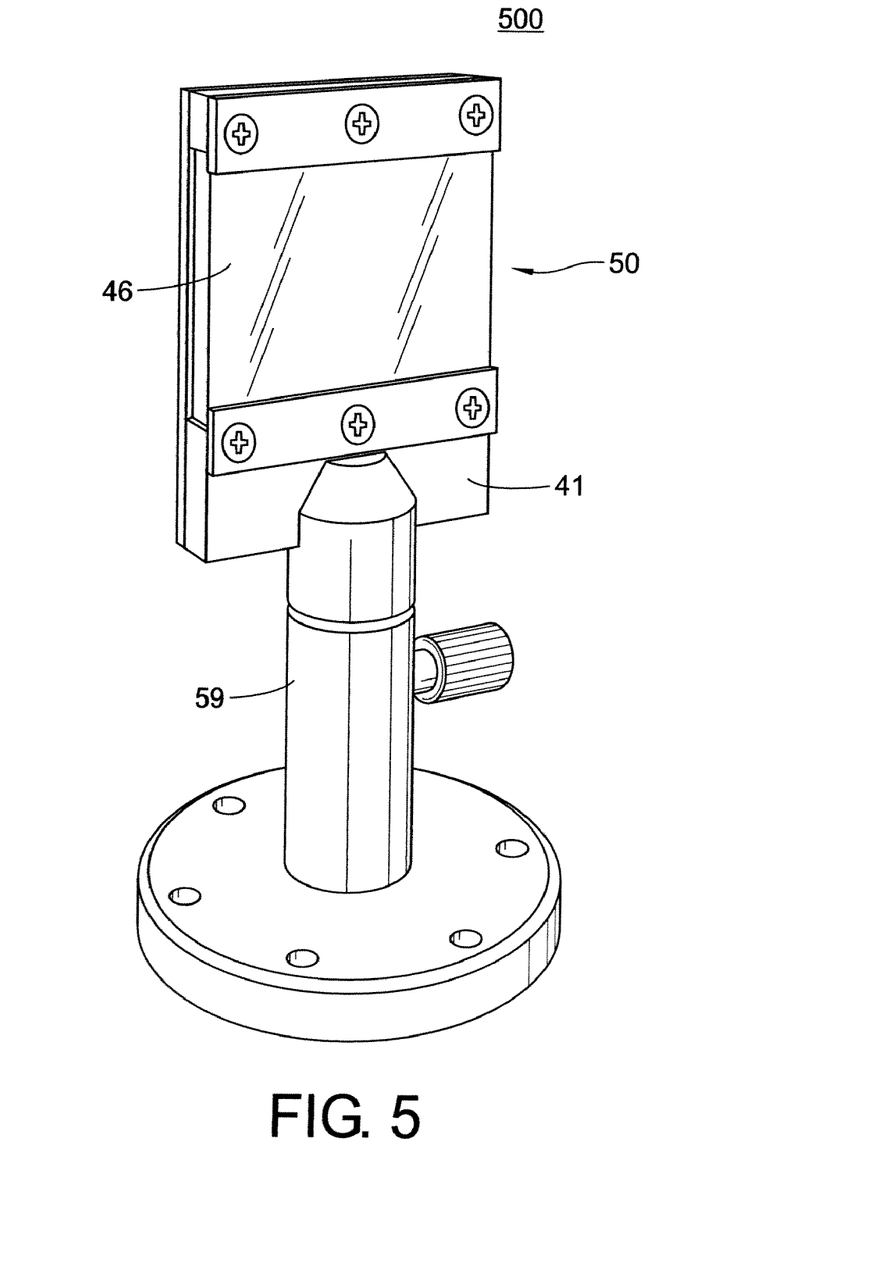
FIG. 5 is a photo which shows an optical element fixing body in an embodiment of the present invention.

An optical element fixing body can be formed by using an optical element fixing structure of the present invention. FIG. 5 is a photo which shows the construction of an optical element fixing body in an embodiment of the present invention. In the figure, an optical element fixing body 500 is constituted by an optical element fixing structure 50, which is any of the above-described optical element fixing structures 50 and on which an optical element 46 is fixed and mounted, and a fixing part 59 which supports and fixes the optical element fixing structure (18, 19, 20). The above-described optical element fixing structure 50 of the present invention facilitates the handling of an optical element, such as a precision polished crystal, owing its form in which the optical element 46 is fixed to an optical element holder and mounted thereon. However, the handling is further improved by fixing the optical element fixing structure 50 to the fixing part 59 as in this embodiment.

In a case where the optical element fixing body 500 of this embodiment is used by being attached to a rotary goniohead by adopting an arrangement in which the working surface of the optical element 46 coincides with the center axis of the fixing part 59, it is possible to prevent the problem that the irradiation position of electromagnetic waves such as X-rays, electron beams, neutron beams, α-rays, β-rays and other corpuscular rays on the working surface changes depending on angle.

Figure 6:
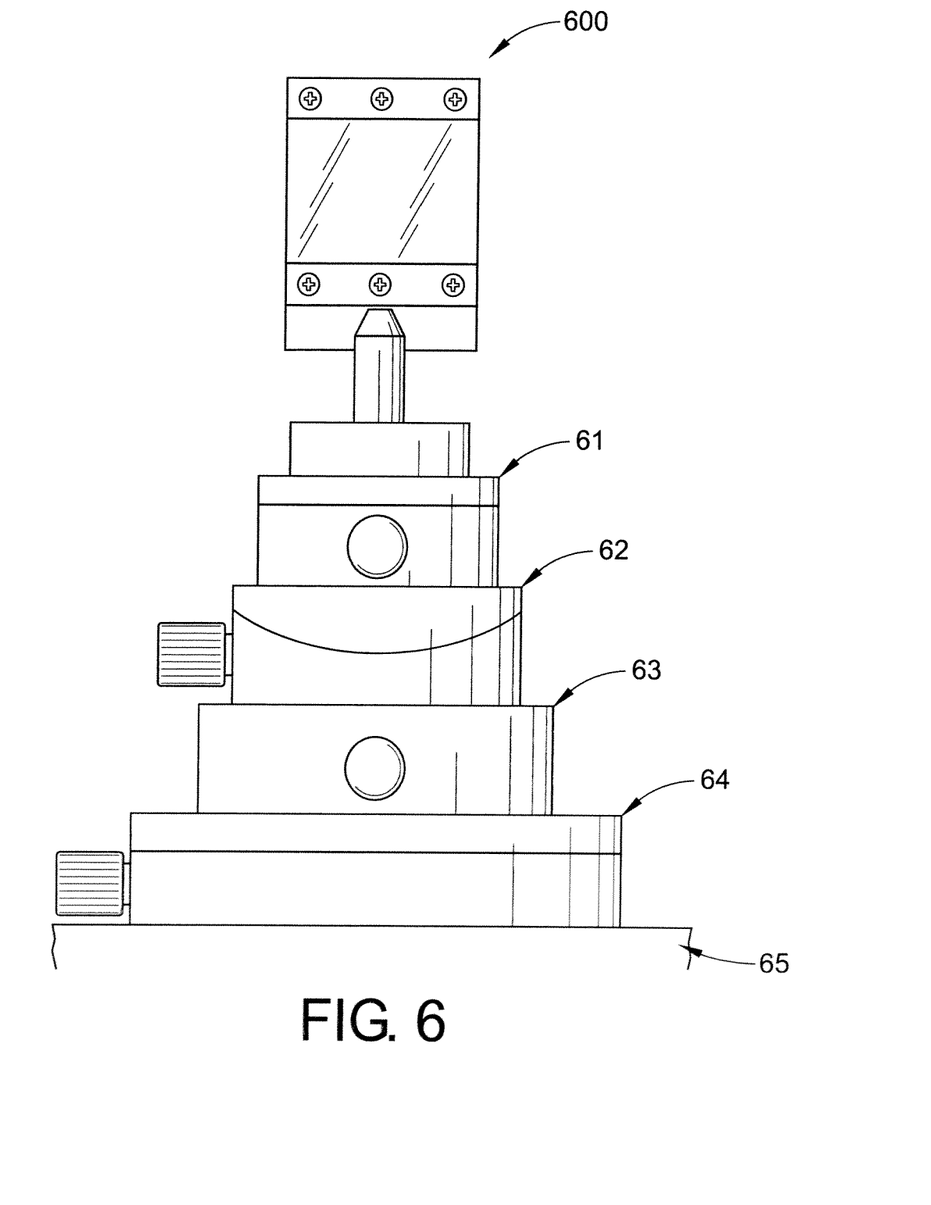
FIG. 6 is a side view which shows an example in which an optical element fixing body in an embodiment of the present invention is mounted on an optical table of a measuring instrument.

Incidentally, FIG. 6 is a side view which shows an example in which an optical element fixing body in this embodiment is mounted on an optical table of a measuring instrument. As shown in the figure, it is possible to use an optical element fixing body 600 which is formed by mounting the optical element main body of this embodiment on a mechanism which is constituted by a linear slide 64 provided on an optical table 65, a rotary goniohead (θ-rotation) 63 and a swivel goniohead (tilt rotation 62, ϕ-rotation 61).

INDUSTRIAL APPLICABILITY

Because an optical element fixing structure, an optical element fixing body, an optical element and an optical element holder of the present invention are constructed as described above, the tightening by use of a fixing screw is unnecessary, making it possible to prevent a decrease in the performance due to the generation of strain of an optical element such as a crystal and to improve the mounting accuracy.

Furthermore, in an optical element of universal shape, such as an optical element in the form of a single plate, various problems, such as the worsening of the planarity during the fixing of this optical element to a holder with a fixing screw, a decrease in the performance of the element due to the generation of strain, possibilities of breakage, a decrease in the mounting accuracy, use of an organic substance spacer, the necessity of handling skills, can be solved.

In addition, it is possible not only to removes the train of an optical element, but also to cut noises such as surface waves and abnormal transmitted waves and to improve the performance of an optical element itself.

The invention claimed is:

1. An optical element fixing structure comprising:
an optical element having a front surface, a back surface spaced from the front surface such that an element thickness is at least partially defined therebetween, an outer peripheral edge extending between the front and back surfaces, and at least one slit spaced inwardly from the outer peripheral edge and outwardly of a working portion of the optical element that is formed inwardly of the at least one slit such that a fixing portion of the optical element is formed between the at least one slit and the outer peripheral edge, the at least one slit extending into the optical element in an approximate direction of the element thickness from along one of the front and back surfaces to a depth that is less than the element thickness such that the working portion and the fixing portion remain at least partially connected with one another; and,
an optical element holder to fix and mount the optical element, the optical element holder including an inner circumferential surface and depressing means for fixing the optical element by depressing at least one of the front surface and the back surface of the optical element along the fixing portion outside the at least one slit such that an area of the other one of the front surface and the back surface outside the at least one slit is fixed against the inner circumferential surface and thereby reducing the propagation of depression-induced strain in the working portion of the optical element.

2. The optical element fixing structure according to claim 1, characterized in that the depressing means depresses only one of the back surface and the front surface of the optical element.

3. The optical element fixing structure according to claim 1, characterized in that the depressing means includes an elastic body attached to the optical element holder.

4. The optical element fixing structure according to claim 1, characterized in that the planer shape of the optical element is any of a rectangle, a circle, an ellipse and a polygon.

5. The optical element fixing structure according to claim 1, characterized in that the depth of the at least one slit is sufficient for preventing the propagation of depression strain of the optical element to the working surface of the optical element.

6. The optical element fixing structure according to claim 5, characterized in that the depth of the at least one slit is not less than half the thickness of the optical element.

7. The optical element fixing structure according to claim 1, characterized in that the at least one slit extends between opposing ends with at least one end being open to the outer peripheral edge of the optical element.

8. The optical element fixing structure according to claim 7, characterized in that the optical element is in the shape of a rectangle and in that both of the opposing ends of the at least one slit are open to the outer peripheral edge of the optical element.

9. The optical element fixing structure according to claim 2, characterized in that the elastic body is a plate spring.

10. The optical element fixing structure according to claim 1, further comprising a base that includes opposing front and back surfaces, the elastic body is provided on the front surface of the base for fixing the elastic body, the base is supported on a bottom part of the optical element holder with the back surface of the base operatively engaging adjusting means for adjusting the depression by the elastic body by up-and-down movements of the base relative to the inner circumferential surface for fixing the elastic body.

11. The optical element fixing structure according to claim 1, characterized in that the optical element is a crystal for X-ray monochrometer.

* * * * *